US011106873B2

(12) United States Patent
Berger et al.

(10) Patent No.: US 11,106,873 B2
(45) Date of Patent: Aug. 31, 2021

(54) CONTEXT-BASED TRANSLATION RETRIEVAL VIA MULTILINGUAL SPACE

(71) Applicant: SAP SE, Walldorf (DE)

(72) Inventors: Annika Berger, Karlsruhe (DE); Angelika Kirilin, Leimen (DE); Nora von Thenen, Hamburg (DE); Jochen Geib, Speyer (DE)

(73) Assignee: SAP SE, Walldorf (DE)

( * ) Notice: Subject to any disclaimer, the term of this patent is extended or adjusted under 35 U.S.C. 154(b) by 144 days.

(21) Appl. No.: 16/253,436

(22) Filed: Jan. 22, 2019

(65) Prior Publication Data

US 2020/0233927 A1 Jul. 23, 2020

(51) Int. Cl.
*G06F 40/30* (2020.01)
*G06F 40/47* (2020.01)

(52) U.S. Cl.
CPC .............. *G06F 40/30* (2020.01); *G06F 40/47* (2020.01)

(58) Field of Classification Search
CPC ........... G06F 40/30; G06F 40/42; G06F 40/47
USPC .................................................... 704/2, 4, 9
See application file for complete search history.

(56) References Cited

U.S. PATENT DOCUMENTS

| 5,510,981 A * | 4/1996 | Berger | G06F 40/44 704/2 |
| 8,306,806 B2 * | 11/2012 | Shi | G06F 40/49 704/3 |
| 8,326,598 B1 * | 12/2012 | Macherey | G06F 40/44 704/4 |
| 10,417,350 B1 * | 9/2019 | Mohamed | G06F 40/58 |
| 10,867,597 B2 * | 12/2020 | Deoras | G10L 15/1815 |
| 2004/0030542 A1 * | 2/2004 | Fuji | G06F 40/47 704/2 |
| 2005/0021323 A1 * | 1/2005 | Li | G06F 40/44 704/5 |
| 2005/0197827 A1 * | 9/2005 | Ross | G06F 16/90344 704/2 |
| 2010/0262621 A1 * | 10/2010 | Ross | G06F 16/90344 707/780 |

(Continued)

OTHER PUBLICATIONS

Bahdanau, et al. "Neural machine translation by jointly learning to align and translate." arXiv preprint arXiv: 1409.0473. Sep. 2014, pp. 1-15. (Year: 2014).*

(Continued)

*Primary Examiner* — Lamont M Spooner
(74) *Attorney, Agent, or Firm* — Buckley, Maschoff & Talwalkar LLC

(57) ABSTRACT

Provided is a system and method for retrieving a translation of a source word based on context. For example, the context may include other words in a same file as the source word. The context can be used to identify the correct semantic meaning of the source word when the word has multiple contextual meanings. In one example, the method may include identifying a source word from a data file, determining a plurality of translation candidates for the source word which translate the source word from a source language into a different language, retrieving a target translation candidate for the source word from among the plurality of translation candidates based on context of the source word included in the data file, and outputting the translated target translation candidate for display via a display device.

19 Claims, 9 Drawing Sheets

(56) References Cited

U.S. PATENT DOCUMENTS

| | | | | |
|---|---|---|---|---|
| 2012/0022852 | A1* | 1/2012 | Tregaskis | G06F 40/47 704/3 |
| 2012/0323554 | A1* | 12/2012 | Hopkins | G06F 40/44 704/2 |
| 2013/0124186 | A1* | 5/2013 | Donabedian | G06F 40/40 704/2 |
| 2014/0350914 | A1* | 11/2014 | Andrade Silva | G06F 40/44 704/2 |
| 2015/0006157 | A1* | 1/2015 | Andrade Silva | G06F 40/247 704/9 |
| 2016/0232160 | A1* | 8/2016 | Buhrmann | G06F 16/248 |
| 2016/0321160 | A1* | 11/2016 | Joo | G06N 5/02 |
| 2017/0060854 | A1* | 3/2017 | Zeng | G06F 40/55 |
| 2017/0060855 | A1* | 3/2017 | Song | G06F 40/44 |
| 2017/0177712 | A1* | 6/2017 | Kopru | G06F 16/3337 |
| 2017/0235824 | A1* | 8/2017 | Liu | G06N 20/00 707/723 |
| 2017/0308526 | A1* | 10/2017 | Uchiyama | G06F 40/211 |
| 2017/0323203 | A1* | 11/2017 | Matusov | G06N 3/0445 |
| 2018/0011843 | A1* | 1/2018 | Lee | G06F 40/51 |
| 2018/0046618 | A1* | 2/2018 | Lee | G06F 40/53 |
| 2018/0089169 | A1* | 3/2018 | Yamauchi | G06F 40/247 |
| 2018/0210878 | A1* | 7/2018 | Lee | G06F 40/40 |
| 2018/0307679 | A1* | 10/2018 | Duong | G06N 3/082 |
| 2018/0349359 | A1* | 12/2018 | McCann | G06N 3/08 |
| 2018/0373704 | A1* | 12/2018 | Lee | G06F 40/58 |
| 2019/0129947 | A1* | 5/2019 | Shin | G06N 3/0445 |
| 2019/0138606 | A1* | 5/2019 | Tu | G06F 40/49 |
| 2019/0163747 | A1* | 5/2019 | Kang | G06F 17/16 |
| 2019/0197119 | A1* | 6/2019 | Zhang | G06F 40/49 |
| 2019/0227823 | A1* | 7/2019 | Xiao | G06F 40/103 |
| 2019/0251178 | A1* | 8/2019 | Tu | G06N 3/08 |
| 2019/0332677 | A1* | 10/2019 | Farhan | G06F 40/45 |
| 2020/0034436 | A1* | 1/2020 | Chen | G06N 3/08 |
| 2020/0073947 | A1* | 3/2020 | Bertoldi | G06F 40/47 |
| 2020/0081982 | A1* | 3/2020 | Tu | G06N 3/08 |
| 2020/0160841 | A1* | 5/2020 | Lee | G06N 3/08 |
| 2020/0372217 | A1* | 11/2020 | Abuammar | G06F 40/56 |

OTHER PUBLICATIONS

Choi, Heeyoul, Kyunghyun Cho, and Yoshua Bengio. "Context-dependent word representation for neural machine translation." Computer Speech & Language 45. Sep. 2017, pp. 149-160. (Year: 2017).*

Chousa, et al. "Training neural machine translation using word embedding-based loss." arXiv preprint arXiv:1807.11219. Jul. 2018, pp. 1-7. (Year: 2018).*

Gao, Jianfeng, et al. "Learning semantic representations for the phrase translation model." arXiv preprint arXiv:1312.0482. Nov. 2013, pp. 1-9. (Year: 2013).*

Hill, Felix, et al. "Embedding word similarity with neural machine translation." arXiv preprint arXiv:1412.6448. Dec. 2014, pp. 1-12. (Year: 2014).*

Kalchbrenner, et al. "Recurrent continuous translation models." Proceedings of the 2013 Conference on Empirical Methods in Natural Language Processing. Oct. 2013, pp. 1700-1709. (Year: 2013).*

Qi, Ye, et al. "When and why are pre-trained word embeddings useful for neural machine translation?." arXiv preprint arXiv: 1804.06323. Apr. 2018, pp. 1-7. (Year: 2018).*

Gonzales, et al. "Improving word sense disambiguation in neural machine translation with sense embeddings." Proceedings of the Second Conference on Machine Translation. Sep. 2017, pp. 11-19. (Year: 2017).*

Takano et al. "Machine translation considering context information using Encoder-Decoder model." 2018 IEEE 42nd Annual Computer Software and Applications Conference (COMPSAC). vol. 1. IEEE, Jul. 2018, pp. 793-794. (Year: 2018).*

Wu, Yonghui, et al. "Google's neural machine translation system: Bridging the gap between human and machine translation." arXiv preprint arXiv:1609.08144. Sep. 2016, pp. 1-23. (Year: 2016).*

Zhang, Jiajun, et al. "Mind the gap: Machine translation by minimizing the semantic gap in embedding space." Twenty-Eighth AAAI Conference on Artificial Intelligence. Jun. 2014, pp. 1657-1663. (Year: 2014).*

Zou, Will Y., et al. "Bilingual word embeddings for phrase-based machine translation." Proceedings of the 2013 Conference on Empirical Methods in Natural Language Processing. Oct. 2013, pp. 1393-1398. (Year: 2013).*

Smith, Samuel L. et al., "Offline Bilingual Word Vectors, Orthogonal Transformations and the Inverted Softmax", Under review as a conference paper at ICLR, Feb. 13, 2017, 10 pp.

* cited by examiner

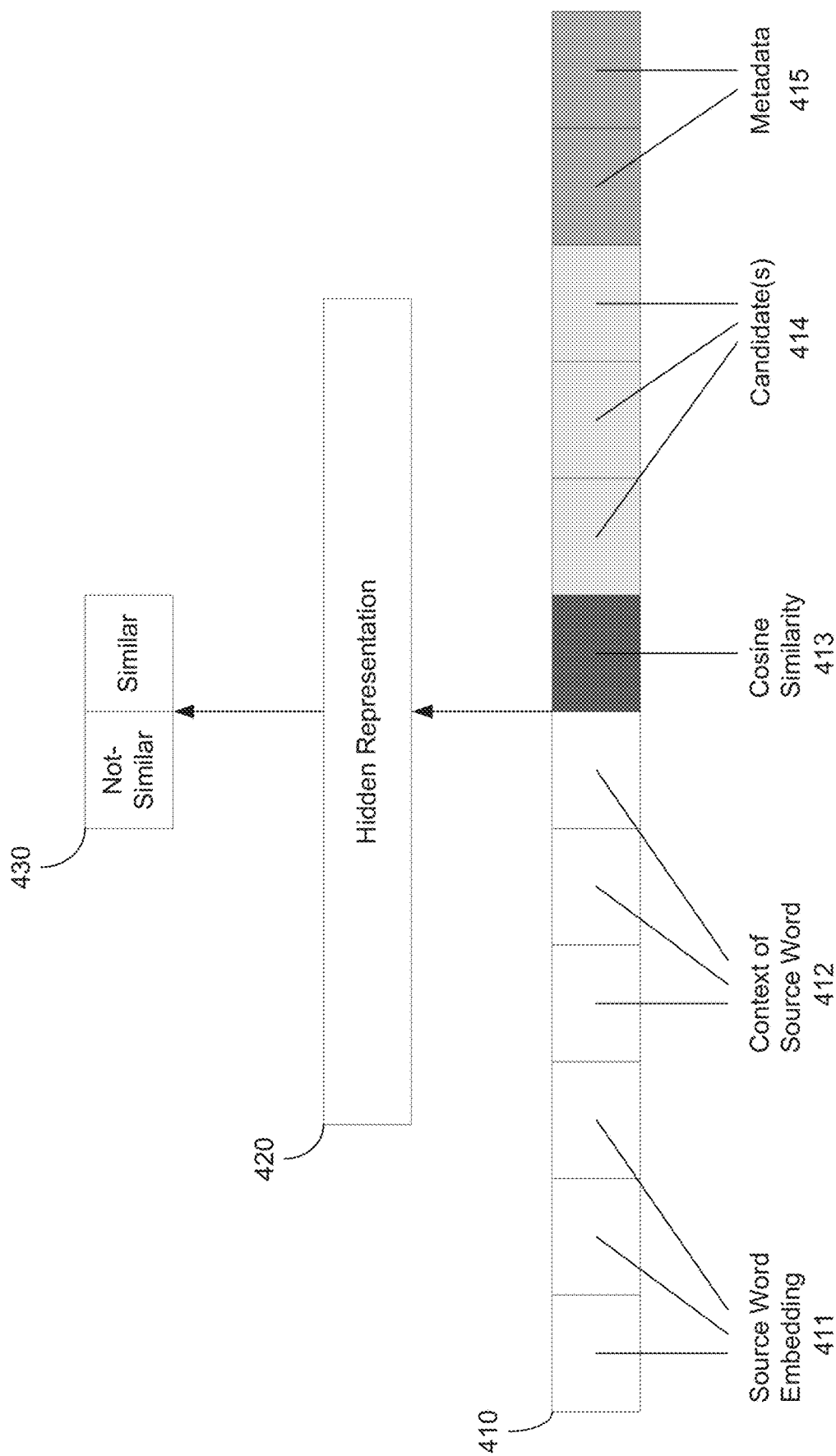

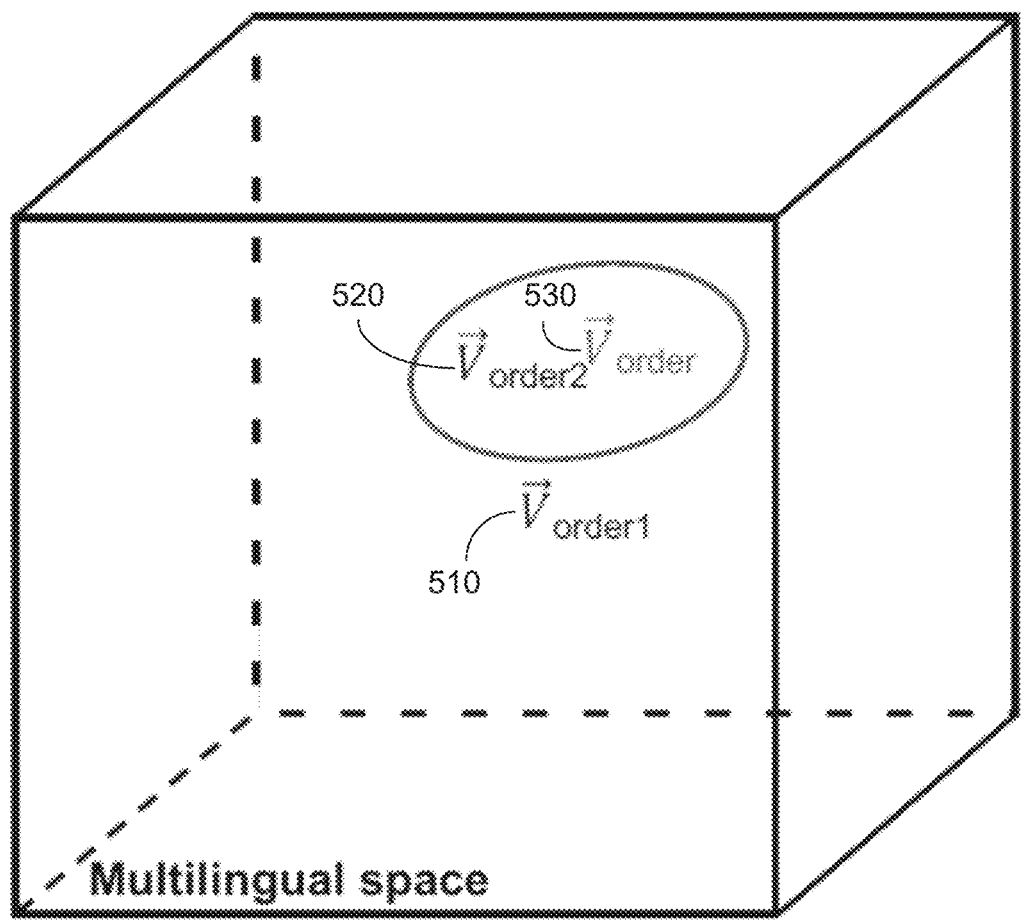

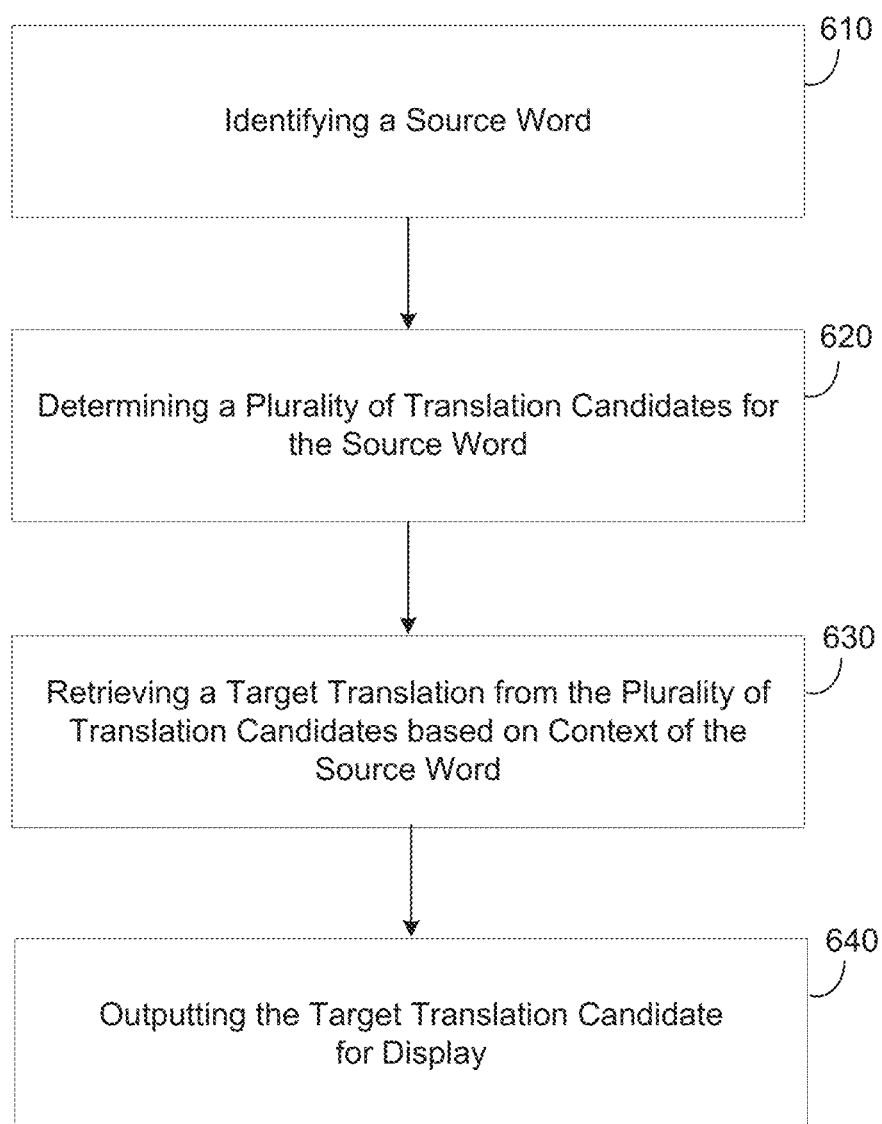

US 11,106,873 B2

CONTEXT-BASED TRANSLATION RETRIEVAL VIA MULTILINGUAL SPACE

BACKGROUND

Machine translation is an automated process of translating text from a source language to a target language. To decode the meaning of source text, a machine translation system must interpret and analyze the features of the text. This is a process which requires in-depth knowledge of the grammar, semantics, syntax, idioms, etc., of the source language, as well as the culture of its speakers. In addition, the machine translation system needs the same in-depth knowledge to re-encode the meaning in the target language. For developers of such machine translation systems, the difficulty lies in how to train a machine to understand text as a human does, and to create a translation of the text in a different language that sounds as if it has been written by a person.

Though it works much faster, automated translation programs sometimes have difficulty to produce output which is fluent and fully grammatically correct. Of particular difficulty for a machine translation system is determining an accurate translation of a source word which has multiple meanings in the source language. As an example, the term "second" in English can refer to second position in line, a second on a clock, etc. Although spelled the same, the two meanings are different and often require different translations when being translated into a target language. State of the art machine-translations systems work well on large bodies of text which need to be converted because the level of accuracy in the conversion does not need to be perfect. However, short pieces of text (such as from a user interface) require perfect translations. Accordingly, an improved mechanism for translations of such short segments is needed.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 4 is a diagram illustrating an architecture of a feed forward neural network based on context in accordance with an example embodiment.

FIGS. 5A-5C are diagrams illustrating a process of selecting a candidate feature vector as a target translation in accordance with an example embodiment.

FIG. 6 is a diagram illustrating a method of determining a target translation for a source word in accordance with an example embodiment.

Figure 1:
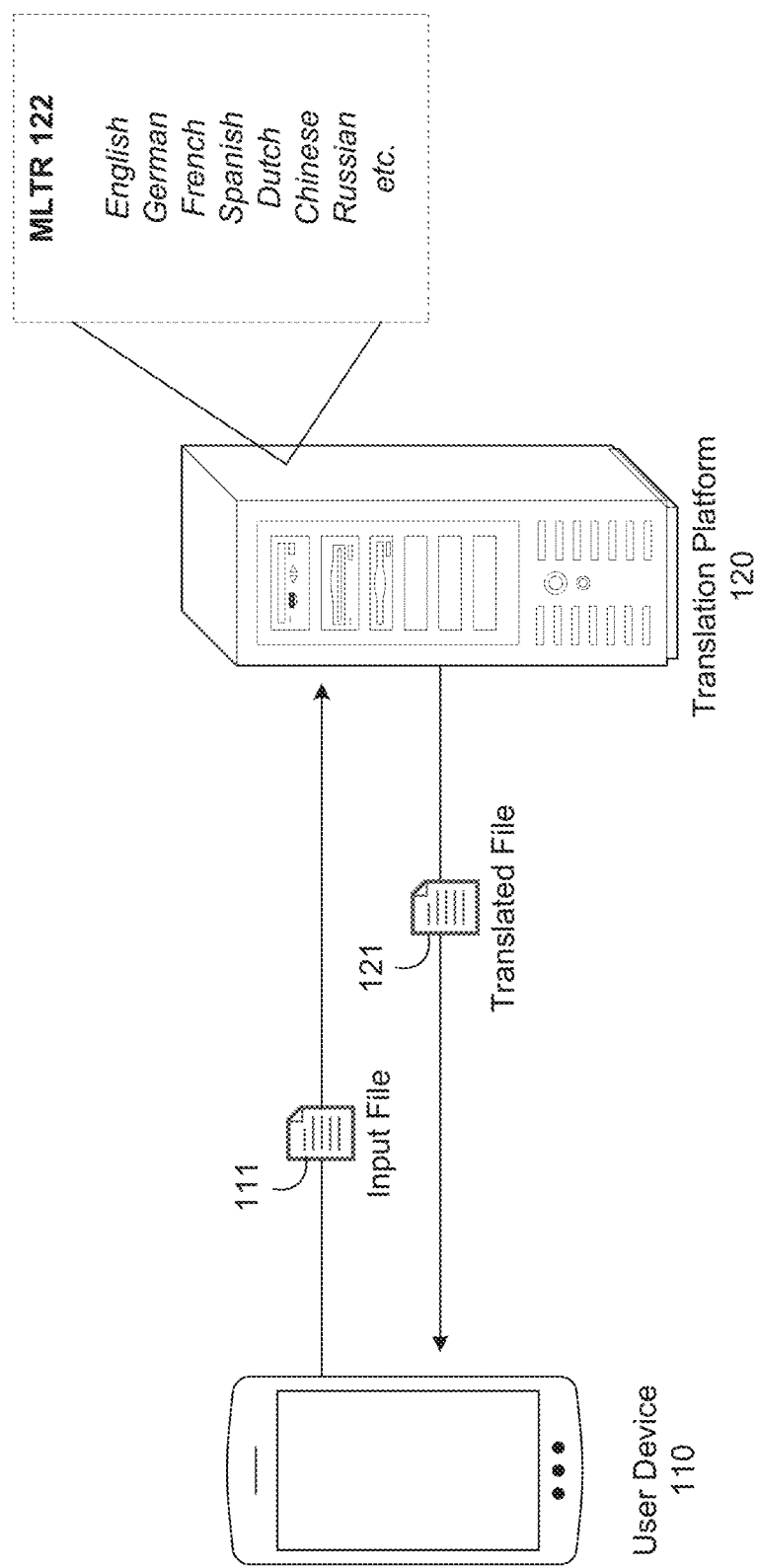
FIG. 1 is a diagram illustrating a network in which a user device requests translation of a data file in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

A translation retrieval algorithm may translate a single piece of text (word, phrase, sentence, etc.) based on a look-up operation in a translation memory storing translated text to find the best fit for the piece of text. During this process, the retrieval algorithm may rank candidates using a rule-based approach such as SQL statements (when the translation memory is a relational database, etc.), and the like. However, the rule-based approach is deterministic because it ranks according to a statically defined criteria. Therefore, the algorithm may be unable to adapt to changes or influences of other words or meanings that are included in context. Furthermore, the rule-based algorithm may only focus on a source string of letters and a fixed metadata which it uses to try and match to entries in a memory. However, it may not consider semantic meaning of a word or context associated with the word being translated. The translation retrieval system described herein may extend upon the translation retrieval algorithm by retrieving translation candidates using context.

According to various embodiments, provided is a translation retrieval algorithm based on machine learning that overcomes the drawbacks of the related art, and significantly improves the accuracy of translation by considering a semantic meaning of a source word as well as context (e.g., other words) that is associated with the source word. The system may receive a data file such as an application data file that could be a Java properties file, a XML file, or any kind of file containing short pieces of text. The system may determine the correct translations for one or more words in the file based on a multilingual text repository (MLTR). The file may include a key-value pair format with a listing text in a specific language. The text may include single words, short phrases, etc., such as user interface texts in an application. Each input file may contain only one language. A translation memory stores previously translated segments bilingually in that a source word is translated into a specific target language. The MLTR, however, stores previously translated segments multilingually in that the source word is translated into multiple different languages.

The system described herein may convert a source word, as well as context of the source word, into feature vectors in multilingual feature space. Monolingual word embeddings are trained for several languages on historical translation data. As described herein, monolingual word embeddings trained on several languages may be combined into a multilingual space to achieve multilingual word embeddings. The feature vector may be determined individually for each translation candidate (previously stored vectors) in the multilingual feature space to choose the correct semantic meaning of the source word. As described herein, a candidate translation refers to a correct semantic meaning of the source word. In the example of the source word "second," the two translation candidates may be second (with respect to numerical order) or second (with respect to seconds of time). The system can determine which of the translation candidates to use based on context of the source word within the data file. Furthermore, the system may then retrieve a translation of the translation candidate which is in one or more different languages.

For example, source words from the data file may be embedded into multilingual space and candidate translations of the source word may have been previously embedded within the multilingual space. Using a feed-forward neural net, the system may separate relevant translation candidates from irrelevant translation candidates. In these examples, the candidates may be the same word in the source language (i.e., the same spelling or string of characters) but with different contextual meanings. The system can detect which contextual meaning of the word is correct based on the vectors in the multilingual vector space. In some embodiments, relevant candidates may be further sorted based on a cosine similarity between the source word and the candidate translation word.

FIG. 1 illustrates a network 100 in which a user device 110 requests translation of a data file 111 in accordance with an example embodiment. Referring to FIG. 1, the user device 110 may submit the data file 111 to a translation platform 120. In this example, the translation platform 120 may be a server, a database, a cloud platform, or the like, and the user device 110 and the translation platform may be connected via a network such as the Internet. However, embodiments are not limited thereto. In another example, the function of the translation platform 120 may be performed by a same device (e.g., user device) that is requesting the translation.

According to various embodiments, the translation platform 120 may store or otherwise have access to a multilingual text repository 122 (MLTR) which stores a plurality of historical translations in multiple different languages as entries. The MLTR 122 may also be referred to as a dictionary, database, or the like. The entries may be stored as database entries in tabular format such as row, column, etc. As another example, the entries may be stored in other formats such as documents, files, web pages, or the like.

In response to receiving the input data file 111, the translation platform 120 may identify translation candidates for a source word included in the data file 111. The translation candidates may be identified from the MLTR 122. For example, the translation platform 120 may perform a translation for each word in the data file 111, words specifically requested by a user of the user device 110, and the like. In response to receiving or identifying a source word for translation, the translation platform 120 may retrieve a translation for the source word in one or more languages and output the translation to a screen of the user device 110. The translation of the source word may be provided in the form of a translated data file 121. As another example, the translation may be simply output to a screen. To determine the correct candidate, the translation platform 120 may map a vector representation of the translation candidates and the source word into a multilingual space, as described in the example of FIG. 2.

As described herein, the translation platform 120 may identify a plurality of translation candidates for a source word. Each translation candidate may have a same spelling in the source language as the source word but different contextual meanings. For example, the term "order" in the English language could semantically mean a written description such as an order at a restaurant, a shopping order when shopping online, etc. As another example, the term "order" could have a semantic meaning such as a command being given. As another example, the term "order" could have a semantic meaning such as a ranking or a categorization of persons or things. The different semantic meanings may be verbs, nouns, etc., and may have different uses for different contextual reasons. To identify which translation candidate (e.g., which use of the term order, etc.) the translation platform 120 may use context associated with the source word.

Figure 2:
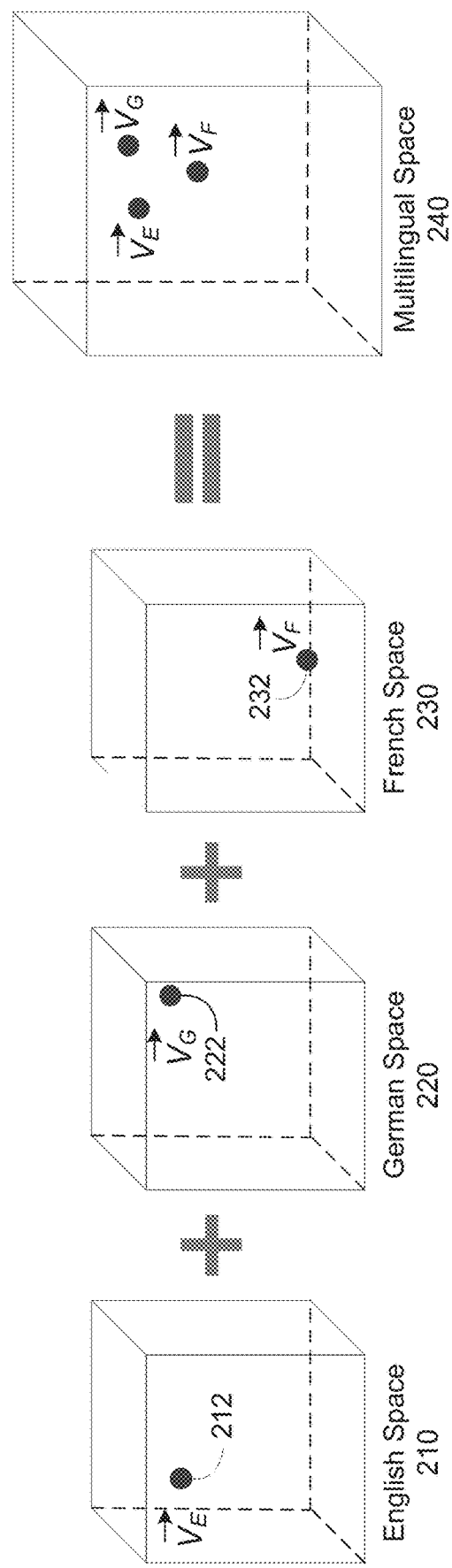
FIG. 2 is a diagram illustrating a multilingual space in accordance with an example embodiment.

FIG. 2 illustrates illustrating a multilingual space 240 in accordance with an example embodiment. The multilingual space 240 may be a high-dimensional vector space where vectors of words in multiple languages may be embedded. For example, the system may train monolingual word embeddings for different language spaces (e.g., spaces 210, 220, 230, etc.) which may include different languages such as English (EN), German (DE), French (FR), Spanish (ES), Russian (RU), Brazilian Portuguese (PT), Chinese (ZH), and the like.

The system may align the different spaces 210, 220, 230, etc., together in the multilingual space 240 based on source-target language pairings (e.g., English to German, etc.). For each source-target language pair (X,Y), the system may generate two ordered matrices $X_D$ and $Y_D$ using a bilingual dictionary where each row corresponds to translations of the same word. The system may further compute an alignment matrix $A = Y_D^T X_D$. Further, the system may compute a singular value decomposition of A and map embedding space Y onto X by applying alignment matrix A onto Y. Furthermore, the system may create the multilingual space 240 by performing a mapping of all languages onto English space.

In the example of FIG. 2, a word may be mapped to each space 210, 220, and 230, as shown by vectors 212, 222, and 232. Monolingual embeddings are not guaranteed to have fixed dimensions that represent the same concept in each dimension. Therefore, translations are not guaranteed to be in the same position in each monolingual space. To address this, an alignment among the monolingual spaces may be performed to obtain a meaningful multilingual space. Therefore, when the vectors are converted into the multilingual space 240, the vectors 212, 222, and 232 are more closely aligned as a result of the alignment performed on the three spaces 210, 220, and 230, to generate the multilingual space 240.

Vectors may be retrieved from multilingual space 240 by the system such as word vectors and multi-word vectors. For example, if text t is a single word, the system may look-up word embedding $\vec{t}$ of t in the lookup table and return $\vec{t}$. As another example, if text t is a phrase or multi-word expression, the system may look-up a word embedding $\vec{w_i}$ for each word $w_i \in t$ in the multilingual space 240 and return an average $$\vec{a} \text{ where } \vec{a} = \frac{1}{n}\sum_{i=1}^{n} w_i,$$

where n is equal to the number of words in the phrase or the multi-word expression.

Furthermore, each of the entries of the MLTR 122 shown in FIG. 1 may be mapped to a multilingual space such as multilingual space 240. For example, each entry from the MLTR 122 (such as a candidate translation) may be represented as a tuple $m_i \in$ MLTR. For each element in the tuple $m_i = (m_{i_{EN}}, m_{i_{DE}}, m_{i_{FR}}, m_{i_{ES}}, m_{i_{RU}}, m_{i_{PT}}, m_{i_{ZH}})$, where $m_{i_{DE}}$ is the language of entry for German, the system may represent in multilingual space 240 using a vector retrieval process where $j \in \{DE, FR, ES, RU, PT, ZH\}$ if EN is the given source language. Furthermore, the system may compute a centroid of all the vectors which may be the final representation of the candidate in the multilingual space.

When translating a source word, the example embodiments use not only the text of the source word (i.e., string of characters) but also other text within the file to give some context to the source word. The other text does not need to be selected but may be detected by the system herein. Traditional translation retrieval techniques do not consider surrounding words or context but rather make a straight look-up of the text/word. Consider an example in which the source word is the term "second." As an example, the term "second" can refer to a number such as the number two, or it can refer to a second of time, such as in seconds, minutes, hours, days, etc. Deciphering between these two semantic meanings is difficult (if not impossible) without considering additional data such as metadata, context, and the like.

The source word described herein may be text (e.g., a string of characters) that is displayed within a user interface. In this example, the text may not be sentences but rather short description (3-4 words, etc.) or phrases with a couple of words therein. Different meanings of the source word may be represented as different translation candidates. A translation candidate is a vector in multilingual space that represents one possible semantic meaning of the source word. Each translation candidate may be a representation of a plurality of vectors for a plurality of translations of the source word into different languages. The resulting vector of the translation candidate may be an average or a centroid of the plurality of vectors corresponding to the plurality of translations.

Translation candidates may arise when there are different semantic meanings for a source word. As another example, translation candidates may also arise when there are different notations of a source word such as uppercase, lowercase, punctuation marks, and the like. For example, a common source phrase may have a first instance which is stored in all lowercase and a second instance in which the first letter of each word in the phrase is capitalized (uppercase). In this example, each of the first and second instances may be two different translation candidates.

The translation candidate refers to a translation of the source word in a specific semantic meaning of a source word. Each source word may include one semantic meaning or more. Some source words may include more than two semantic meanings. The example embodiments identify as many possible semantic meanings of a source word as well as duplicates and different cases for the source word and stores them as a list of candidate translations. The system can be case-insensitive (upper case or lowercase). The system may preferably identify translation candidates having the same case, but can also perform a valid translation with translations candidates having a different case. Then, the system determines which semantic meaning (translation candidate) is the correct semantic meaning based on context of the source word in the initial data file. Candidates may be retrieved from a multilingual text repository that stores historical translations. The example embodiments move away from a deterministic retrieval algorithm and instead rely on a model-based retrieval algorithm which takes context into consideration. The system may convert words into vectors using a multilingual vector space. Before a word can be processed by a machine learning algorithm, it needs to be converted to a numerical value such as a vector.

Figure 3:
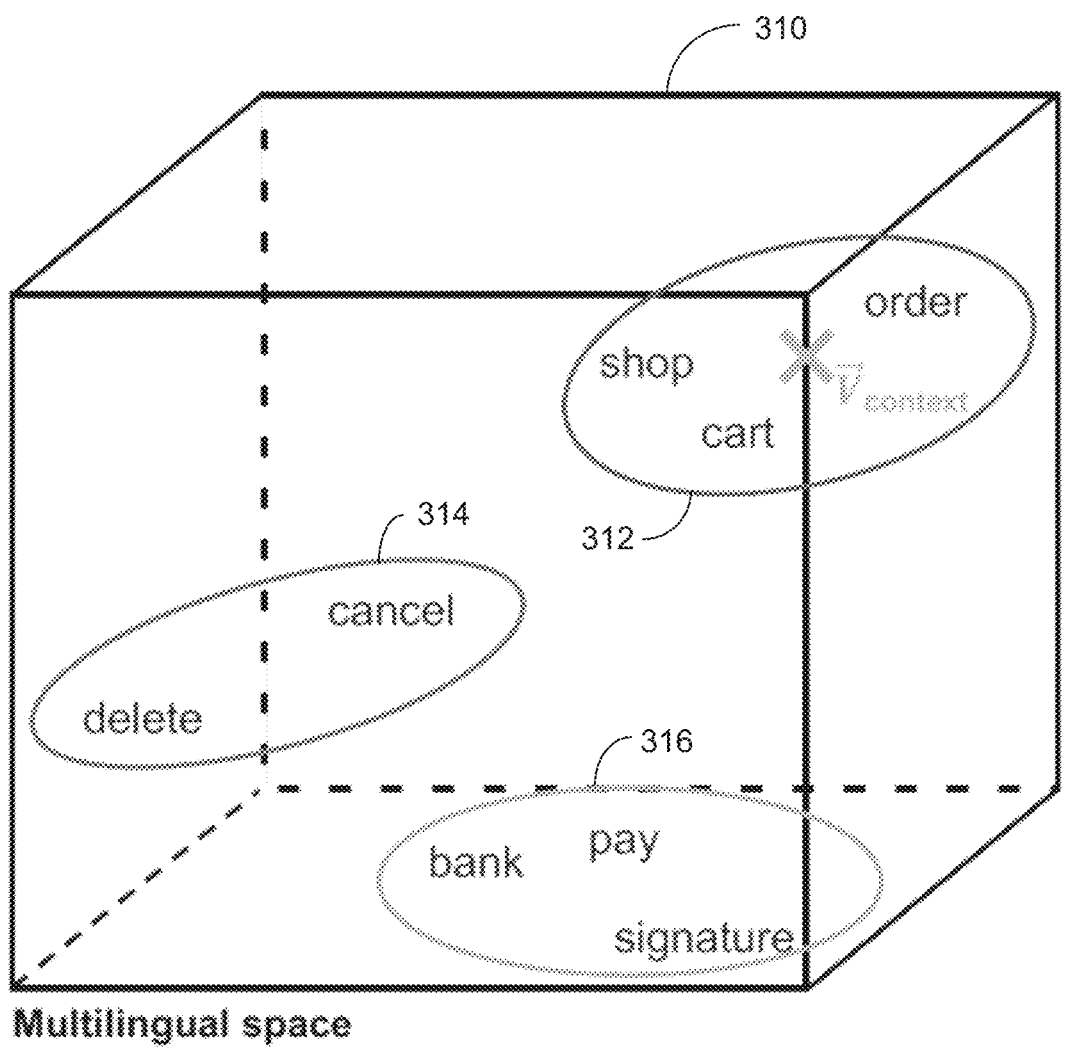
FIG. 3 is a diagram illustrating a process of semantic clustering of context in accordance with example embodiment.

FIG. 3 illustrates a process 300 of semantic clustering of context in accordance with example embodiment. For example, the process 300 may be performed on data entries from the source data file which should be translated. Here, the data entries used to create the semantic clusters may be other short segments of text that are included in the data file that also includes the source word(s) being translated. Semantic clustering may be used to identify words that are commonly associated with each other within a particular context. For example, the word "order" may be semantically associated with terms such as "shopping," "online," "receipt," "cart," etc., when it is used to represent a commission to purchase something. As another example, the word "order" may be semantically associated with the terms "out," "of" "working," "properly," "condition," etc. when it is used to represent a state or condition of an item. Semantic clustering may be used to generate clusters of these words together in multilingual space such that they can be retrieved and used when determining/retrieving a translation for a source word.

Clustering is the basis for the context. The system may receive a large data file with many short segments of text. Using all of this data for purposes of translation can consume significant time and resources. The example embodiments may not use all words from the file. Instead, the system may identify words in the file (other than the source word) that are similar to the source word to be translated based on the semantic clusters. Therefore, the system may cluster the words in the file to identify similar words, and then use the similar words to disambiguate the word itself.

Referring to FIG. 3, a data file including one or more words to be translated may include the text "order," "cancel," and "pay". In this example, each of these terms is clustered into respective semantic clusters 312, 314, and 316, based on other words in the file. For example, the term "order" may be semantically clustered with the textual terms "shop" and "cart" identified from the file. Likewise, the term "cancel" may be semantically clustered with the term "delete" from the file, and the term "pay" may be semantically clustered with terms "bank" and "signature" from the file. These terms may be on the same page, screen, document, etc. or may be from a different page, document, screen, etc.

For example, the system may find semantic clusters for each key-value pair $(k_i, v_i)$ in a data file P. In this example, the system may represent a value $v_i$ as a vector $\vec{v}_i$ in multilingual space. Furthermore, the system may define a graph $G=(V, E)$, where V is a set of vertices in the graph and E is a set of edges in the graph. In this example, the values of $v_i$ in P may be referred to as $V=\{v_i | v_i \in P\}$. The system may draw an edge between two vertices such as $v_i$ and $v_j$ if a cosine similarity between $\vec{v}_i$ and $\vec{v}_j$ is greater than a threshold t in a scenario where $$E = \{\{v_i, v_j\} \text{ if } \cos(\theta) > t\} \text{ where } \cos(\theta) = \frac{\vec{v}_i \cdot \vec{v}_j}{\|\vec{v}_i\| \, \|\vec{v}_j\|}.$$

The system may also compute clusters C using Louvain community detection algorithm so that each $\vec{v}_i$ belongs to exactly one cluster. For each cluster, the system may compute its centroid based on the mean of all vectors in the cluster. This may serve as a representation of the semantic context for all vectors in the cluster. Furthermore, the system may form a look-up table which stores the centroid for each value $v_i$.

FIG. 4 illustrates an architecture 400 of a feed forward neural network based on context in accordance with an example embodiment. Referring to the example of FIG. 4, the feed forward neural net 400 includes an input layer 410 (feature vector) which includes a plurality of attributes 411, 412, 413, 414, and 415. The feed forward neural net 400 also includes an output layer 430 which includes a non-similar output and a similar output. For example, the non-similar output and the similar output may be probabilities that combine to add up to 1. The neural net 400 also includes one or more hidden layers 420 between the input layer 410 and the output layer 430, where artificial neurons take in a set of weighted inputs and produce an output through an activation function that may be determined based on the example embodiments herein.

The example embodiments may train the neural net based on supervised learning. The goal is to find a model N that is able to separate relevant from irrelevant translation candidates. A translation candidate may be relevant if it contains the correct translations for the source word (string) for requested target languages with regards to the source context. The system may use supervised learning to train neural network based on labelled training data such as already translated Java properties files. Each of these entries is data which has been correctly translated and can be used as a point of reference for the network.

In the example of FIG. 4, the input 410 is referred to as a feature vector. The input layer 410 may include a source word embedding 411 which is the vector representation of the source string/word that is being translated. The input layer 410 may also include context of the source word 412 which may be identified from semantic clustering of data within the input data file represented by its centroid in the cluster. The input layer 410 may also include a centroid of a translation candidate 414. Here, the translation candidate 414 may be a tuple in multilingual vector space based on the source language of the source word. In addition, the input layer 410 may include metadata 415 such as language count and occurrence of the translation candidate based on historical data. Based on the source string 411 and the centroid of the translation candidate 414, the system determines the cosine similarity 413 between the two which again is used as one feature in the feature vector.

The system may perform a process for retrieving a best possible translation candidate from the multilingual text repository using the feed forward neural net 400 shown in FIG. 4. In particular, each translation candidate may be analyzed using the feed forward neural net 400 based on the source word, and the context of the source word. Therefore, the left half of the feature vector (input layer 410) including the source word 411 and the context 412 may be the same for each translation candidate, while the right side of the feature vector may be different including a different cosine similarity.

According to various embodiments, for each key-value pair $(k_i, v_i)$ in an input data file, the system may retrieve a multilingual text repository (MLTR) entry (translation candidate $m_1$) that contains the translations of the value $v_i$ in the desired target languages. The system may map the translation candidate $m_i$ into a vector $\vec{m}_i$ in multilingual space. The system may find a translation candidate list T, where T= $\{m_1, \ldots, m_n | m_i \in MLTR\}$. Each candidate may be a tuple with $m_{i_j} = v_i$ where j is the source language (e.g., English, etc.). The system may identify all translation candidates stored in the MLTR and create a look-up table to store the text versions of the translation candidates including the translations into any of the other different languages along with its vector representations.

The system may then map all translation candidates into multilingual space and receive a centroid $\vec{m}_i$ of each translation candidate from among a mean of all language translations of the translation candidate in the multilingual vectors space. Next, the system may prepare an input for prediction by the feed forward neural network 400. The system may compute a cosine similarity between $\vec{v}_i$ and $\vec{m}_i$. Metadata of the translation candidate such as occurrence and language count looked-up in the MLTR may be attached to the entry. Furthermore, the system may look-up a semantic cluster centroid belonging to $v_i$. Each translation candidate may be independently run through the feed forward neural net 400 to determine a relevancy of the translation candidate to the source word to be translated.

The system may filter the translation candidate list by removing irrelevant candidates based on a prediction performed by the feed forward neural net 400. In some embodiments, the remaining translation candidate(s) may be output. As another example, the system may further sort the remaining translation candidates (when there is more than one) based on language count, occurrence, etc., of the translation candidate in the MLTR. Here, the system may keep a top predetermined number of translation candidates after the ranking. The system may further sort the remaining translation candidates based on the cosine similarity to identify a most relevant translation candidate from the remaining translation candidates. Furthermore, the system may translate the source word based on the most relevant translation candidate to provide a most relevant contextual translation of the source word.

By considering context from other words, the system herein can predict the appropriate semantic meaning of the word being translated, and therefore provide a more accurate translation of the source word. Machine learning requires algorithms which need numbers as input so the algorithms have something to compute. The system herein turns text (source words and translation candidates) into vectors in a high-dimensional space. The system works in a multilingual space so that a word can be represented as a vector in all languages rather than as a vector in a single language. This allows the system to work on multiple languages for translation at the same time. The history of the words is stored in a multilingual text repository.

The vector is learned. Based on which words occur together (context) in a file, the algorithm herein gives you a high-dimensional semantic representation of a source word which is referred to as a target translation candidate. In this space, the vector represents the meaning of the word. Words that are close in meaning are close to each other in vector space. Additionally, the system not only analyzes words from one language that are close to each other in a single language space but translations of the words (multilingual aspect) that are also close to each other in the multilingual vector space. The input may be a text file (phrase), and the output may be a translation in multiple languages at the same time. The system may not construct the translation, but may retrieve the translation from entries in the multilingual repository which is a big dictionary of all translations that have been performed in the past. Since there are multiple translations for one word into one language, the algorithm selects the best translation for the word based on the context.

When the system has a word that it wants to translate (source word) the system may go through all possible translation candidates. The feed forward neural network tells you whether it's a good translation or a bad translation. The feed forward neural network may compare the source word to a dictionary entry and give you a relevancy. The system chooses a translation for a source word based on which translation candidate is determined to be the most relevant to the semantic meaning of the source word based on context of other words. As a result, the system provides a more accurate translation of a source word based on other words in a file or other data object which can provide semantic context.

Figure 5A:
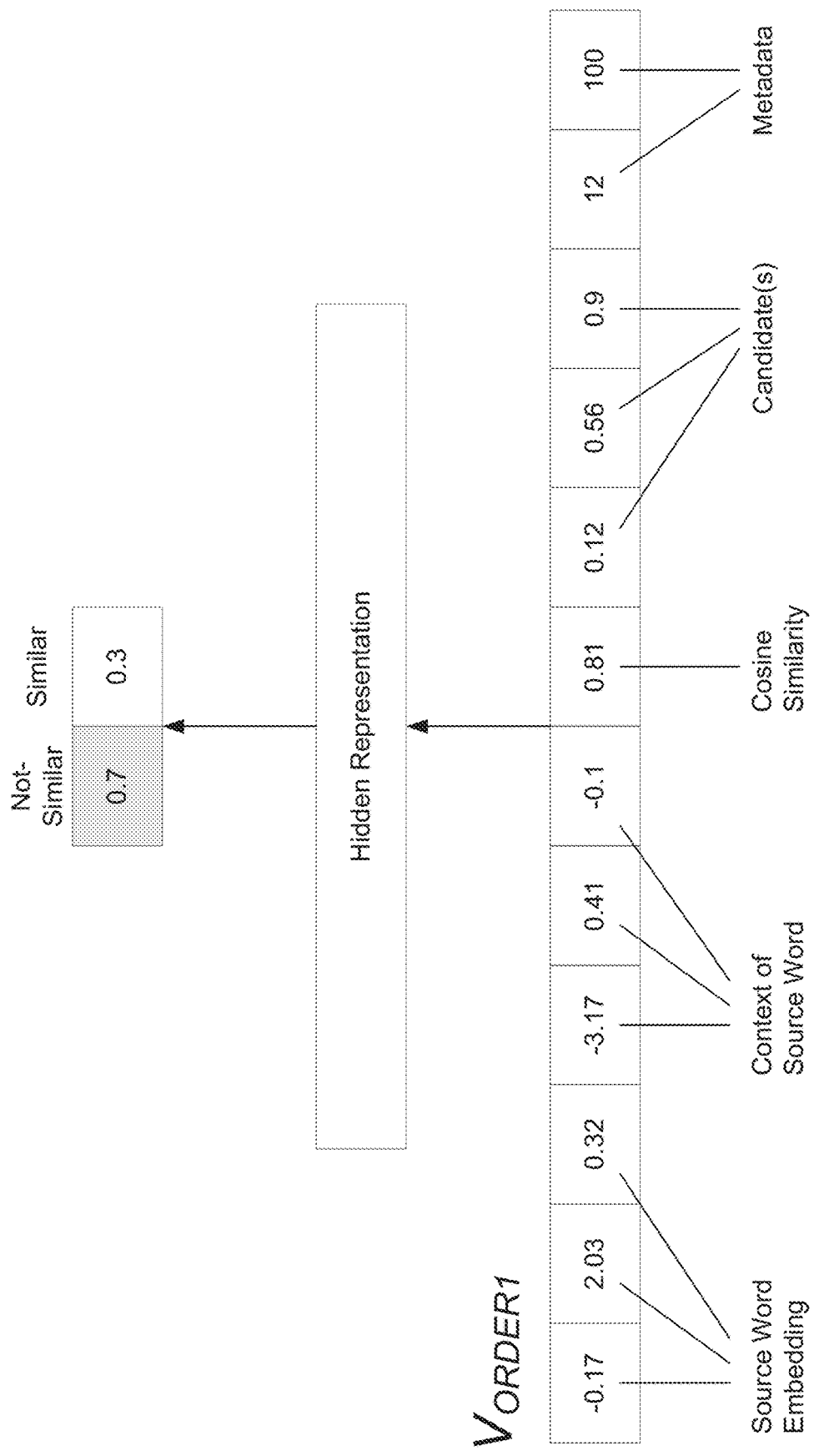
Figure 5B:
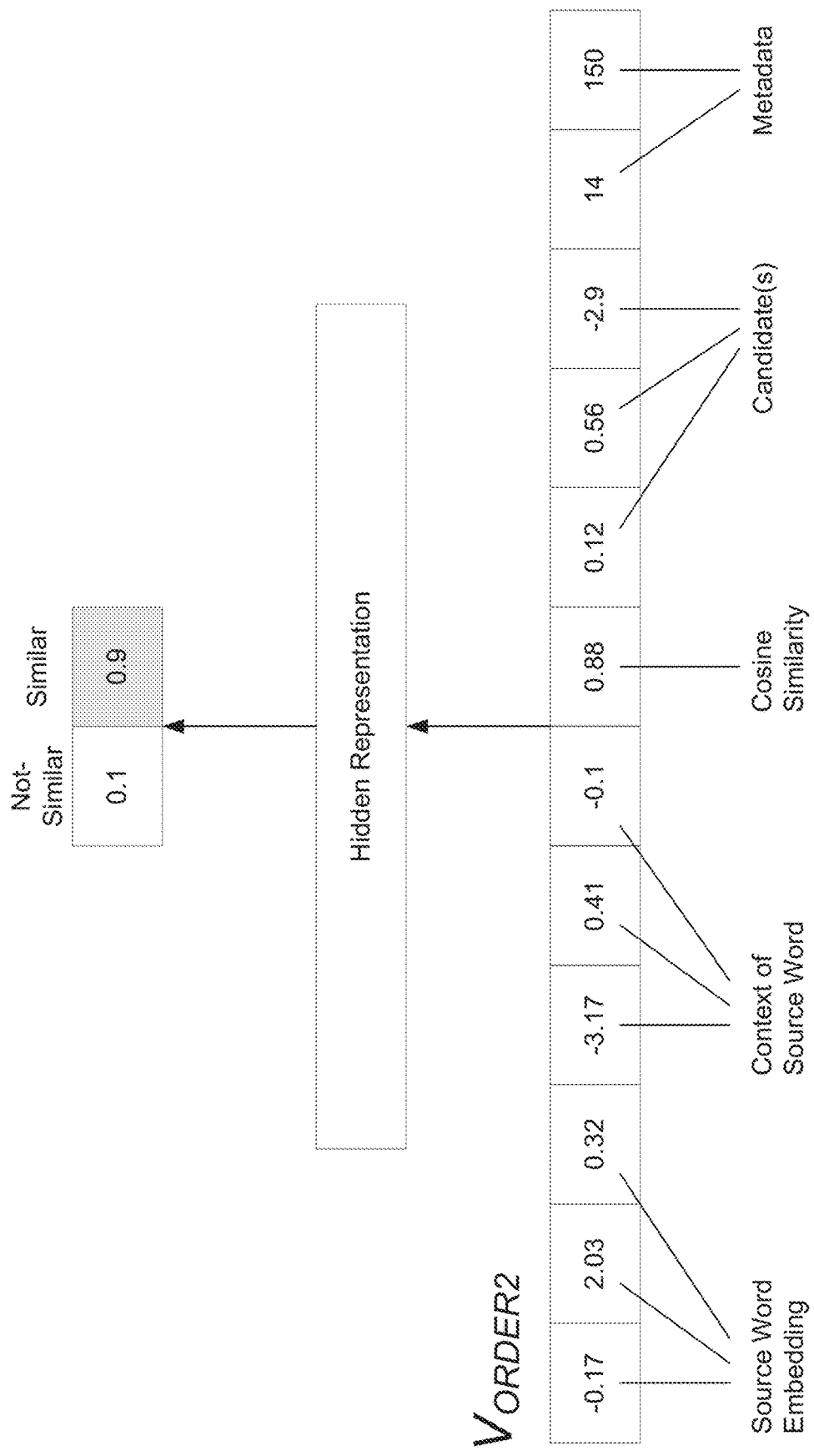

FIGS. 5A-5C illustrate a process of selecting a translation candidate as a target translation candidate in accordance with an example embodiment. Referring to FIGS. 5A-5C, a source word of "order" is considered by the system for translation. In English, the term "order" can have numerous semantic meanings. In this example, the system considers two of these meanings. In particular, the term "order" may have the semantic meaning of a rule of law such as an ordonnance. This term is referred to as ORDER1. Meanwhile, the term "order" may have a semantic meaning of a purchase of goods or services. This term is referred to as ORDER2. While both of these semantic meanings are spelled the same in English, the translation into a different language such as French is different depending on which semantic meaning of the term "order" is being used. For example, for ORDER1, the correct French translation is "ordonnance." Meanwhile, for ORDER2, the correct French translation is "commander." Therefore, determining which semantic meaning of the term "order" is correct, can drastically change the translation of the term from "ordonnance" to "commander" when translating the term order into French.

FIG. 5A illustrates a process 500A of the term "order" having a semantic meaning of an ordinance (ORDER1) being processed as a translation candidate using the feed forward neural network. In this example, the combination of the attributes (source word, context, cosine similarity, candidate translation, metadata) determine that the semantic meaning of the term order is probably not an ordinance. In contrast, FIG. 5B illustrates a process 500B of the term "order" having a semantic meaning of a purchase order (ORDER2) being processed as a translation candidate using the feed forward neural network. In this example, the feed forward neural network determines that the term order most likely has the semantic meaning of a purchase order. Therefore, the translation candidate (semantic meaning of order=purchase order) is chosen as the target translation candidate. FIG. 5C shows a multilingual space 500C in which the different semantic meanings of order (i.e., ORDER1 and ORDER2) are mapped as vectors 510 and 520, respectively, in vector space. Here, the source word is also mapped as a vector 530. As shown, the source word vector 530 is nearer to the second semantic meaning of the term order, vector 520.

Once the target translation candidate is determined, the system herein may identify a translation for the source word based on any of the different language translations for the target translation candidate and retrieve the identified translation for output.

FIG. 6 illustrates a method 600 of combining feature sets of data in accordance with an example embodiment. For example, the method 600 may be performed by a database node, a cloud platform, a web server, a computing system (e.g., user device, etc.), a combination of devices/nodes, or the like. Referring to FIG. 6, in 610, the method may include identifying a source word from a data file. For example, the method may receive a data file from a user device for translation of all words in the data file, some words in the data file, and the like. The data file may include a XML, data file, a Java properties file, a spreadsheet, a word document, a web page, and the like. The data file may include text such as short phrase, sentences, and the like. In some embodiments, the text may be the text from a plurality of pages of a mobile application or web-based application which include short descriptive phrases for a user interface or graphical display, or the like. However, this is just one example. As another example, the data file may include other text data unrelated to a user interface or an application such as one or more words submitted via a query through a website, etc.

In 620, the method may include determining a plurality of translation candidates for the source word which translate the source word from a source language into a different language. The translation candidates may have the same spelling as the source word in the source language but have different meanings. As another example, the translation candidates may be the same word as the source word in the source language but with different notations (punctuation, uppercase, lowercase, etc.). As an example, the term "second" may have a first meaning related to a numerical value and a second meaning related to time. The system herein may identify both versions of second as possible translation candidates for the source word "second." When translated, the word may be translated differently depending on the meaning, the target language, and the like. For example, the plurality of translation candidates may include a common spelling of the source word but have different contextual meanings. For example, each translation candidate may correspond to a different contextual meaning of the source word in the source language and further include translations of the source word into a plurality of other languages based on the different contextual meaning.

In 630, the method may include retrieving a target translation for the source word from among the plurality of translation candidates based on context of the source word included in the data file. The context may be used to identify the target translation and may be processed using a neural network. For example, the context of the source word may include other words that are included in the data file. In some embodiments, the determining may include predicting, via the neural network, the target translation for the source word based on semantic clusters associated with the plurality of translations candidates. For example, a semantic cluster associated with a respective translation candidate may include a cluster of words including the source word that are commonly used together.

According to various embodiments, the method may further include mapping the plurality of translation candidates into a plurality of vectors in multilingual space. The multilingual space may represent all languages considered by the system such as French, English, German, Russian, Chinese, and many others. In this example, the determining of the target translation may include mapping the source word into a vector in the multilingual space and identifying a nearest vector from among the plurality of vectors of the plurality of translation candidate as the target machine translation. The system may retrieve the translation candidate corresponding to the nearest vector.

In 640, the method may include outputting the determined target translation of the source word for display via a display device. The outputting may include displaying the source word in the source language, the translation of the source word in a target language, a probability of the prediction, other meanings of the source word which were considered but not selected, and the like. In some embodiments, the outputting may include simultaneously outputting a plurality of target translations of the source word in a plurality of different languages, respectively. Here, the system may provide multiple translations of the source word into multiple different languages, in response to a single request.

Figure 7:
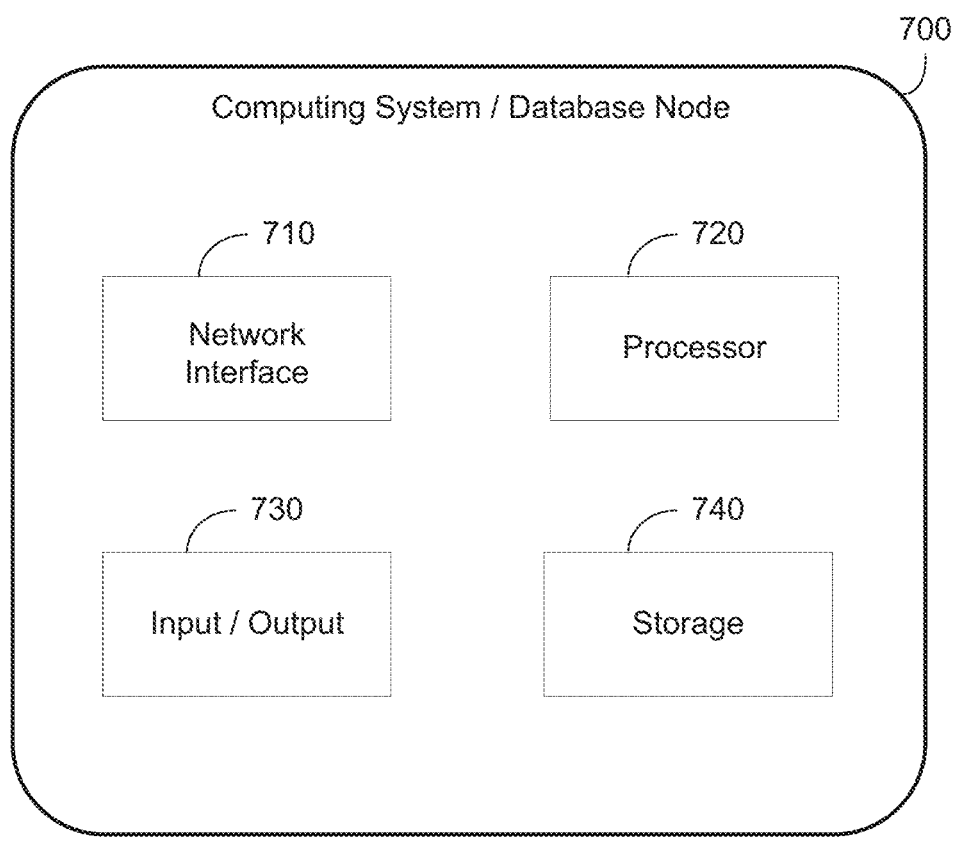
FIG. 7 is a diagram illustrating a computing system for use in the examples herein in accordance with an example embodiment.

FIG. 7 illustrates a computing system 700 that may be used in any of the methods and processes described herein, in accordance with an example embodiment. For example, the computing system 700 may be a database node, a server, a cloud platform, or the like. In some embodiments, the computing system 700 may be distributed across multiple computing devices such as multiple database nodes. Referring to FIG. 7, the computing system 700 includes a network interface 710, a processor 720, an input/output 730, and a storage device 740 such as an in-memory storage, and the like. Although not shown in FIG. 7, the computing system 700 may also include or be electronically connected to other components such as a display, an input unit(s), a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The input/output 730 may include an interface, a port, a cable, a bus, a board, a wire, and the like, for inputting and outputting data to and from the computing system 700. For example, data may be output to an embedded display of the computing system 700, an externally connected display, a display connected to the cloud, another device, and the like. The network interface 710, the input/output 730, the storage 740, or a combination thereof, may interact with applications executing on other devices.

The storage device 740 is not limited to a particular storage device and may include any known memory device such as RAM, ROM, hard disk, and the like, and may or may not be included within a database system, a cloud environment, a web server, or the like. The storage 740 may store software modules or other instructions which can be executed by the processor 720 to perform the method shown in FIG. 6. According to various embodiments, the storage 740 may include a data store having a plurality of tables, partitions and sub-partitions. The storage 740 may be used to store database records, items, entries, and the like.

According to various embodiments, the storage 740 may store a data file such as a XML file, a spreadsheet, a word document, a table, a web page, and the like. The data file may be received from another device via the network interface 710. The processor 720 may identify a source word from the data file, determine a plurality of translation candidates for the source word which translate the source word from a source language into a different language, and retrieve a target translation for the source word from among the plurality of translation candidates based on context of the source word included in the data file. In addition, the processor 720 may output the determined target translation of the source word for display via a display device.

In some embodiments, the context of the source word may include other words and/or phrases that are included in the data file. The context of the source word may be in the form of semantic clusters of context which are stored within a multilingual space. In this example, the processor 720 may retrieve the target translation candidate for the source word based on the semantic clusters associated with the plurality of translations candidates. For example, a semantic cluster associated with a respective translation candidate comprises a cluster of words that are commonly used with the translation candidate. For example, for the first meaning of the term second referring to second in numerical value, other contextual terms related to the first meaning of second may include first, third, place, line, etc. Meanwhile, for a second meaning of the term second referring to second of time, other contextual terms related to the second meaning of second may include clock, hour, minute, day, etc. In these examples, the plurality of translation candidates may include a common spelling of the source word but different contextual meaning. For example, each translation candidate may correspond to a different meaning of the source word in the source language and may include translations of the source word into a plurality of other languages based on the different meaning of the source word. Therefore, the translation of the word second into Russian may be different based on whether the term refers to second (numerical) and second (time).

In some embodiments, the processor 720 may map the plurality of translation candidates into a plurality of vectors in multilingual space. In some embodiments, the processor 720 may map the source word into a vector in the multilingual space and identify a nearest vector from among the plurality of vectors of the plurality of translation candidate as the target translation. For example, the processor 720 may input the plurality of translations candidates into a neural network which uses the context to predict the target translation candidate. In some embodiments, the processor 720 may simultaneously retrieve and output a plurality of target translations of the source word in a plurality of different languages, respectively.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a storage configured to store a data file; and
   a processor configured to
      identify a source word from the data file,
      determine a plurality of translation candidates for the source word which translate the source word from a source language into a different language,
      generate a plurality of vectors for the plurality of translation candidates, respectively, each vector comprising a combination of values including a value for the source word, a value for context associated with the source word, a value for a different respective translation candidate from among the plurality of translation candidates, and a cosine similarity between the source word and the different respective translation candidate,
      input the plurality of vectors into a neural network which determines for the plurality of translation candidates based on the plurality of input vectors a relevancy of each respective translation candidate to the source word,
      remove less relevant translation candidates from the plurality of translation candidates based on the determined relevancy of each respective translation candidate, and
      choose a target translation candidate that has a greatest cosine similarity from among remaining translation candidates which have not been removed,
   wherein the processor is further configured to output the translated target translation candidate for display via a display device.

2. The computing system of claim 1, wherein the storage comprises a multilingual text repository which stores prior translations of the source word in a plurality of different languages.

3. The computing system of claim 1, wherein the processor is configured to predict the target translation candidate for the source word based on semantic clusters built from other entries in the data file.

4. The computing system of claim 3, wherein a semantic cluster associated with a respective translation candidate comprises a cluster of words that are commonly used with the source word.

5. The computing system of claim 1, wherein the plurality of translation candidates comprise a common spelling of the source word but with different contextual meaning.

6. The computing system of claim 1, wherein each translation candidate corresponds to at least one of a different meaning of the source word in the source language and a different notation of the source word, and includes translations of the source word into a plurality of other languages.

7. The computing system of claim 6, wherein the processor is further configured to map the plurality of translation candidates into a plurality of vectors in multilingual space.

8. The computing system of claim 7, wherein the processor is configured to map the source word into a vector in the multilingual space.

9. The computing system of claim 1, wherein the processor is configured to simultaneously output a plurality of translations of the target translation candidate in a plurality of different languages, respectively.

10. The computing system of claim 1, wherein the value for the different respective translation candidate comprises a centroid value computed from an average of multiple vectors representing the translation candidate in multiple different languages.

11. A method comprising:
    identifying a source word from a data file;
    determining a plurality of translation candidates for the source word which translate the source word from a source language into a different language;
    generating a plurality of vectors for the plurality of translation candidates, respectively, each vector comprising a combination of values including a value for the source word, a value for context associated with the source word, a value for a different respective translation candidate from among the plurality of translation candidates, and a cosine similarity between the source word and the different respective translation candidate;
    inputting the plurality of vectors into a neural network which determines for the plurality of translation candidates based on the plurality of input vectors a relevancy of each respective translation candidate to the source word;
    removing less relevant translation candidates from the plurality of translation candidates based on the determined relevancy of each respective translation candidate;
    choosing a target translation candidate that has a greatest cosine similarity from among remaining translation candidates which have not been removed; and
    outputting the target translation candidate for display via a display device.

12. The method of claim 11, wherein the determining comprises predicting the target translation candidate for the source word based on based on semantic clusters built from other entries in the data file.

13. The method of claim 12, wherein a semantic cluster associated with a respective target translation candidate comprises a cluster of words that are commonly used with the source word.

14. The method of claim 11, wherein the plurality of translation candidates comprise a common spelling of the source word but with different contextual meaning.

15. The method of claim 11, wherein each translation candidate corresponds to at least one of a different meaning of the source word in the source language and a different notation of the source word, and includes translations of the source word into a plurality of other languages.

16. The method of claim 15, further comprising mapping the plurality of translation candidates into a plurality of vectors in multilingual space.

17. The method of claim 16, wherein the identifying of the target translation candidate further comprises mapping the source word into a vector in the multilingual space.

18. The method of claim 11, wherein the outputting comprises simultaneously outputting a plurality of translations of the target translation candidate in a plurality of different languages, respectively.

19. A non-transitory computer-readable medium storing instructions which when executed by a processor cause a computer to perform a method comprising:

identifying a source word from a data file;
determining a plurality of translation candidates for the source word which translate the source word from a source language into a different language;
generating a plurality of vectors for the plurality of translation candidates, respectively, each vector comprising a combination of values including a value for the source word, a value for context associated with the source word, a value for a different respective translation candidate from among the plurality of translation candidates, and a cosine similarity between the source word and the different respective translation candidate;
inputting the plurality of vectors into a neural network which determines for the plurality of translation candidates based on the input plurality of vectors a relevancy of each respective translation candidate to the source word;
removing less relevant translation candidates from the plurality of translation candidates based on the determined relevancy of each respective translation candidate;
choosing a target translation candidate that has a greatest cosine similarity from among remaining translation candidates which have not been removed; and
outputting the translated target translation candidate for display via a display device.

* * * * *